United States Patent
Takano

(10) Patent No.: US 8,144,400 B2
(45) Date of Patent: Mar. 27, 2012

(54) LENS APPARATUS

(75) Inventor: Kentaro Takano, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/895,968

(22) Filed: Oct. 1, 2010

(65) Prior Publication Data

US 2011/0085253 A1    Apr. 14, 2011

(30) Foreign Application Priority Data

Oct. 14, 2009   (JP) .................................. 2009-237358

(51) Int. Cl.
G02B 27/10        (2006.01)

(52) U.S. Cl. ........................................ 359/619; 359/700

(58) Field of Classification Search ................... 359/619
See application file for complete search history.

(56) References Cited

U.S. PATENT DOCUMENTS

| 4,614,416 | A | * | 9/1986 | Suzuki et al. | ................. 396/132 |
| 4,623,227 | A | * | 11/1986 | Kamata | ........................ 359/705 |
| 6,185,375 | B1 | * | 2/2001 | Mikami | ......................... 396/84 |

FOREIGN PATENT DOCUMENTS

JP            9-070778 A       3/1997

* cited by examiner

*Primary Examiner* — Ricky Mack
*Assistant Examiner* — James Jones
(74) *Attorney, Agent, or Firm* — Rossi, Kimms & McDowell LLP

(57) ABSTRACT

Provided is a lens apparatus including: a lens barrel; a fixed stopper fixed to the lens barrel; an optical unit moving in a direction of an optical axis relative to the lens barrel; a cylindrical grooved cam which includes a stopper restrictor and is held in the lens barrel to be rotatable about a rotation axis parallel to the optical axis, for restricting movement of the optical unit in the direction of the optical axis; and a movable stopper which is movable within a limit of the stopper restrictor, in which the movable stopper is in contact with the stopper restrictor and the fixed stopper to restrict a rotation range of the cylindrical grooved cam.

22 Claims, 6 Drawing Sheets

LENS APPARATUS

BACKGROUND OF THE INVENTION

1. Field of the Invention

The present invention relates to a lens apparatus, and more particularly, to a zoom-cam mechanism for a zoom lens apparatus.

2. Description of the Related Art

An example of a unit widely used to move a zoom lens unit in a zoom lens includes a cylindrical cam mechanism. A cam groove having a locus of an optical axis of the zoom lens unit is provided in a circumference of a cylindrical cam. When the cam rotates, the zoom lens unit moves on the optical axis along the locus of the cam groove to perform a zooming operation. A stopper mechanism in which a stopper part provided on the cam is in contact with a stopper provided in a housing rotably holding the cam is used as a unit for limiting a wide angle end and a telephoto end during the rotation of the cam. In this case, a limited rotation angle of the cam is approximately 330°.

When a zoom ratio of the zoom lens increases to lengthen a stroke length of the zoom lens unit, an arranged angle of the cam groove becomes a larger angle relative to the rotation direction of the cam, and hence a rotating torque of the cam increases. When the stroke length of the zoom lens unit is to be lengthened without the increase in rotating torque of the cam, a diameter of the cam or a rotation angle range of the cam may be increased. However, the increase in diameter of the cam causes increases in outer dimension of a product and mass of the cam. Therefore, the rotation angle range of the cam should be desirably increased. In the case of the conventional stopper mechanism, a maximum rotation angle limit of the cam is approximately 330° at most as described above.

An example of a stopper mechanism having a large rotation angle range is disclosed in Japanese Patent Application Laid-Open No. H09-070778.

In the conventional technology disclosed in Japanese Patent Application Laid-Open No. H09-070778, when the cam mechanism is provided with a rotation angle range which exceeds 360°, an external diameter of the cam increases because of a rotatable intermediate ring which is further provided outside a rotation member. For example, when a mechanism serving as the intermediate ring is provided to the cam in the both sides of the cam in the rotation axis direction, a total length in a cam shaft direction lengthens. Therefore, in a case of a zoom lens in which front and rear lens units are close to each other with little margin, the mechanism is likely to interfere with the lens units and thus is not suitable for practical use.

SUMMARY OF THE INVENTION

An object of the present invention is to provide a stopper mechanism for a cam having a large rotation angle range without increasing an outer diameter and a total length of the cam.

In order to achieve the above object, according to the present invention, there is provided a lens apparatus including: a lens barrel; a fixed stopper fixed to the lens barrel; an optical unit moving in a direction of an optical axis relative to the lens barrel; a cylindrical grooved cam which includes a stopper restrictor and is held in the lens barrel to be rotatable about a rotation axis parallel to the optical axis, for restricting movement of the optical unit in the direction of the optical axis; and a movable stopper which is movable within a limit of the stopper restrictor, in which the movable stopper is in contact with the stopper restrictor and the fixed stopper to restrict a rotation limit of the cylindrical grooved cam.

According to the present invention, there can be provided a stopper mechanism for a cam having a rotation angle which exceeds 360° without increasing an outer diameter and a total length of the cam.

Further features of the present invention will become apparent from the following description of exemplary embodiments with reference to the attached drawings.

DESCRIPTION OF THE EMBODIMENTS

Hereinafter, exemplary embodiments of the present invention are described in detail with reference to the attached drawings.

First Embodiment

Hereinafter, a cam stopper mechanism according to a first embodiment of the present invention is described with reference to FIGS. 1A, 1B, 2A to 2E, 3A, 3B, and 4.

Figure 1A:
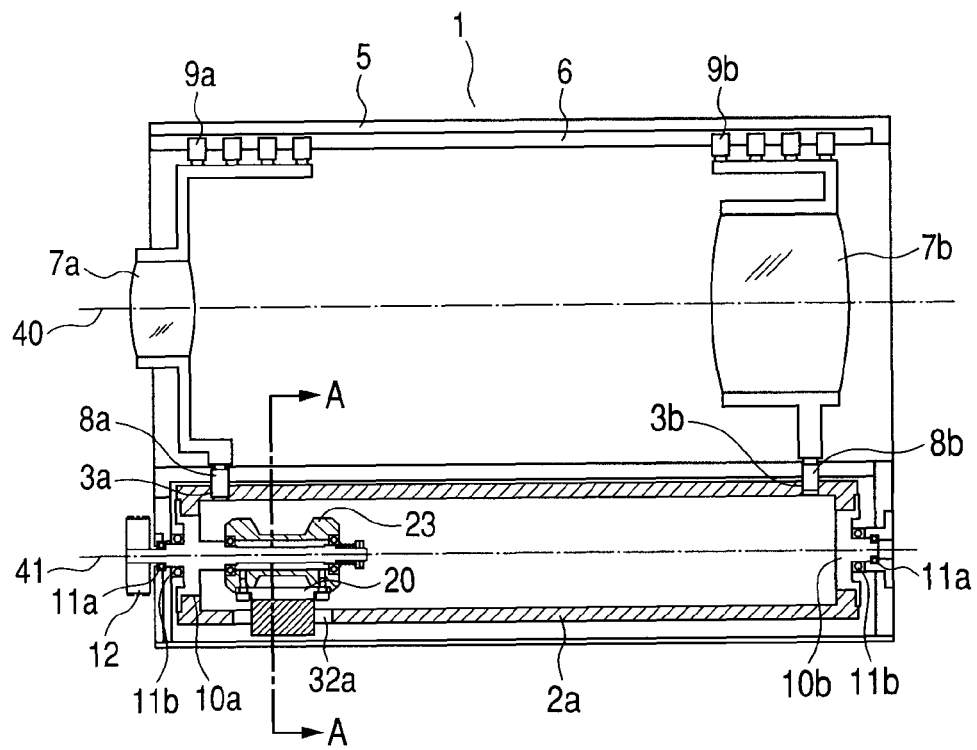
FIG. 1A is a cross sectional view illustrating a zooming member of a zoom lens according to a first embodiment of the present invention.

FIG. 1A is a cross sectional view illustrating a zooming member of a zoom lens according to this embodiment. The zoom lens includes multiple optical units (lens units). A focus lens unit (not shown) and a relay lens unit (not shown) are disposed in the front and/or rear side of the zoom member in the optical axis direction. A cam 2a is a cylindrical grooved cam having a cylindrical shape. On the circumference surface of the cylindrical grooved cam, cam grooves 3a and 3b are processed along movement loci of zoom lens units 7a and 7b in a direction of an optical axis 40. The cam 2a includes cam shafts 10a and 10b provided on the front and rear sides in a rotation axis direction. The cam 2a is held by a cam holding portion fixed to a fixed cylinder (lens barrel) 5 rotatably about a cam center axis 41 substantially parallel to the direction of the optical axis 40 through bearings 11a and 11b. A pulley 12 is connected to a tip end of the cam shaft 10a and coupled to a rotating torque generation part including a zooming control motor and a manual operation handle through a timing belt (not shown). Linear cam rollers 9a and 9b which are slidable in the direction of the optical axis 40 along a linear groove 6 processed in the fixed cylinder 5 are provided to the zoom lens units 7a and 7b in each of three regions about the optical axis 40. Therefore, the zoom lens units 7a and 7b slide in the direction of the optical axis 40 in a state in which the rotation about the optical axis 40 is restricted. Curved cam rollers 8a and 8b are provided to the zoom lens units 7a and 7b, which are engaged with the cam grooves 3a and 3b, respectively. When the cam 2a rotates, the zoom lens units 7a and 7b move in the direction of the optical axis 40 along the cam grooves 3a and 3b formed in the cylindrical surface of the cam 2a. As described above, the zoom lens units 7a and 7b move to adjust an interval between the zoom lens units, to thereby perform the zooming operation.

Next, a structure of the stopper mechanism for determining end positions in a mechanically movable range which correspond to a wide angle end and a telephoto end during the zooming operation is described with reference to FIG. 1B which is an enlarged view illustrating a stopper unit of FIG. 1A. The cam shaft 10a described above protrudes to an inner portion of the cam. A movable stopper base 23 rotatably held by a bearing 11c is provided on the cam shaft 10a. A movable stopper 20 is fixed to the movable stopper base 23. The movable stopper 20 protrudes from the cylindrical surface of the cam 2a through a stopper limit groove (an opening or a hole which is formed in surface of cam and has predetermined width in rotation direction) 32a which is formed in the cylindrical surface of the cam 2a and serves as a stopper restrictor. That is, the movable stopper 20 is located inside the cylindrical surface of the cam 2a, rotatably held coaxially with the cam 2a, and held rotatably in a range of the stopper limit groove 32a. The bearing 11c is precompressed by a charging spring 31 (biasing unit) to prevent the movable stopper 20 and the movable stopper base 23 from rotating about the cam shaft 10a by self weights.

Figure 2A:
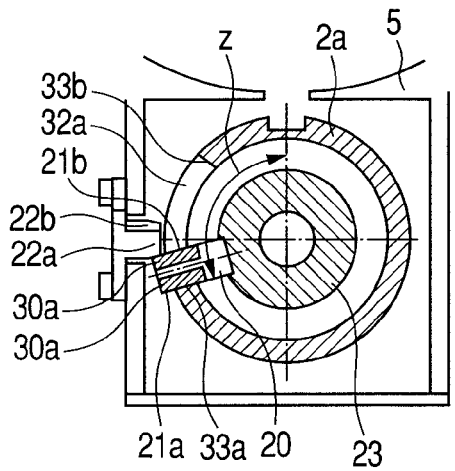
FIG. 2A illustrates a stopper operation flow according to the first embodiment.
Figure 2B:
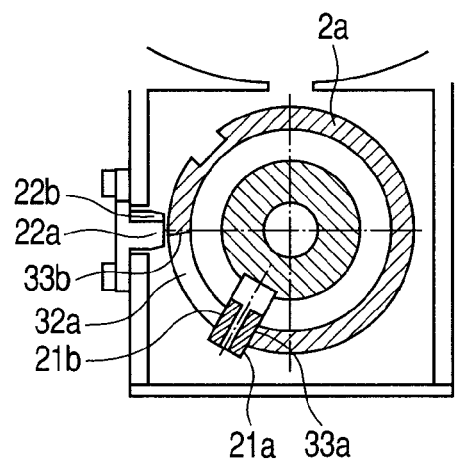
FIG. 2B illustrates the stopper operation flow according to the first embodiment.
Figure 2C:
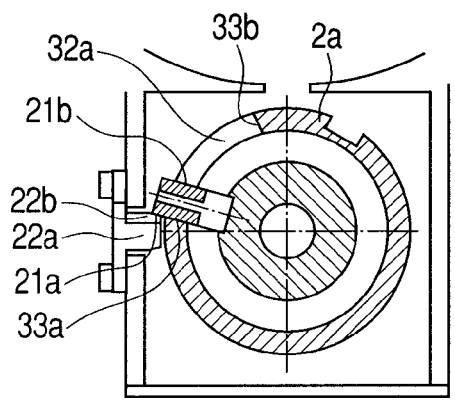
FIG. 2C illustrates the stopper operation flow according to the first embodiment.
Figure 2D:
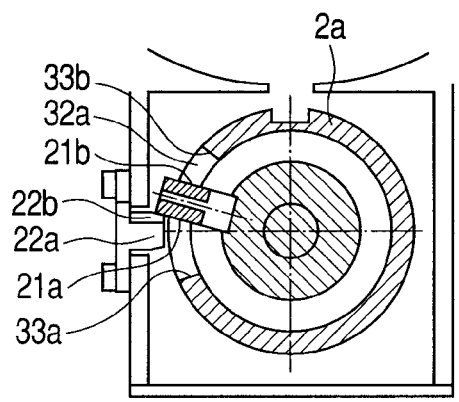
FIG. 2D illustrates the stopper operation flow according to the first embodiment.
Figure 2E:
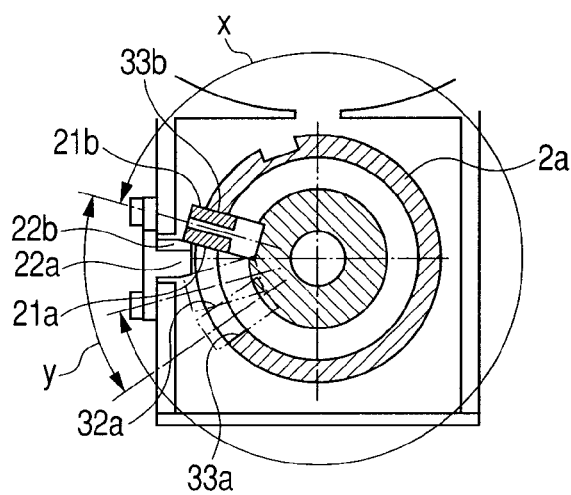
FIG. 2E illustrates the stopper operation flow according to the first embodiment.

An operation of the stopper mechanism according to this embodiment is specifically described with reference to FIGS. 2A to 2E. FIGS. 2A to 2E are schematic cross sectional views along the line A-A illustrated in FIG. 1A, which illustrate the operation of the stopper mechanism between a state at the wide angle end and a state at the telephoto end. FIG. 2A illustrates the state of the stopper mechanism at the wide angle end. A movable stopper end 21a corresponding to a surface of a stopper rubber 30a bonded to the movable stopper 20 is in contact with a stopper limit groove end 33a corresponding to one end surface of the stopper limit groove 32a. Similarly, a movable stopper end 21b is in contact with a fixed stopper 22a. Such a state is assumed as the state at the wide angle end. Therefore, the cam 2a cannot further rotate in a clockwise direction in the state of FIG. 2A. Next, when the cam 2a rotates in a counterclockwise direction in the state of FIG. 2A, the cam 2a is in a state of FIG. 2B. The movable stopper 20 and the movable stopper base 23 do not rotate by self weights as described above, and thus rotate in the counterclockwise direction in the state of FIG. 2B in conjunction with the rotation of the cam 2a. When the cam 2a further rotates in the counterclockwise direction in the state of FIG. 2B, as illustrated in FIG. 2C, a state in which the movable stopper end 21a is in contact with a fixed stopper 22b is obtained. In this state, the rotation of the movable stopper 20 and the movable stopper base 23 is stopped and only the cam 2a rotates in the counterclockwise direction as illustrated in FIG. 2D. When the cam 2a further rotates, as illustrated in FIG. 2E, the movable stopper end 21b is in contact with a stopper limit groove end 33b. The movable stopper end 21a is already in contact with the fixed stopper 22b, and hence the cam 2a cannot further rotate in the counterclockwise direction. This state is the state at the telephoto end. In other words, at each of the wide angle end and the telephoto end (both ends in movable range), the movable stopper is in contact with the fixed stopper and the stopper limit groove. To be specific, when one end of the movable stopper is in contact with one end of the fixed stopper and one end of the stopper limit groove at the wide angle end, another end of the movable stopper is in contact with another end of the fixed stopper and another end of the stopper limit groove at the telephoto end. The one end and the other end are located opposite to each other in the rotation direction of each of the stopper limit groove and the movable stopper. An actual cam rotation range is determined based on a sum of an angle "x" and an opening angle "y" of the stopper limit groove 32a. The angle "x" is defined based on a width of the movable stopper 20, widths of the fixed stoppers 22a and 22b, and a position relationship therebetween. In FIG. 2E, the angle "x" is 330° and the opening angle is 50°, and hence the rotation limit is 380°, as an example. In this case, since "x" is an angle range in which both the cam 2a and the movable stopper 20 can rotate while retaining positional relationship therebetween, the angle "x" corresponds to an angle obtained by subtracting, from 360°, the angle of the movable stopper (angle in case where rotation center of both cam and movable stopper is set as center) and the angle of the fixed stopper. As illustrated in FIG. 2E, the angle "x" is a rotation angle through the states of FIGS. 2A to 2C. The opening angle "y" is obtained by subtracting the angle of the movable stopper from the opening angle of the stopper limit groove 32a (angle in case where rotation center of both cam and movable stopper is set as center). As illustrated in FIG. 2E, the opening angle "y" is a rotation angle through the states of FIGS. 2C to 2E.

Figure 3A:
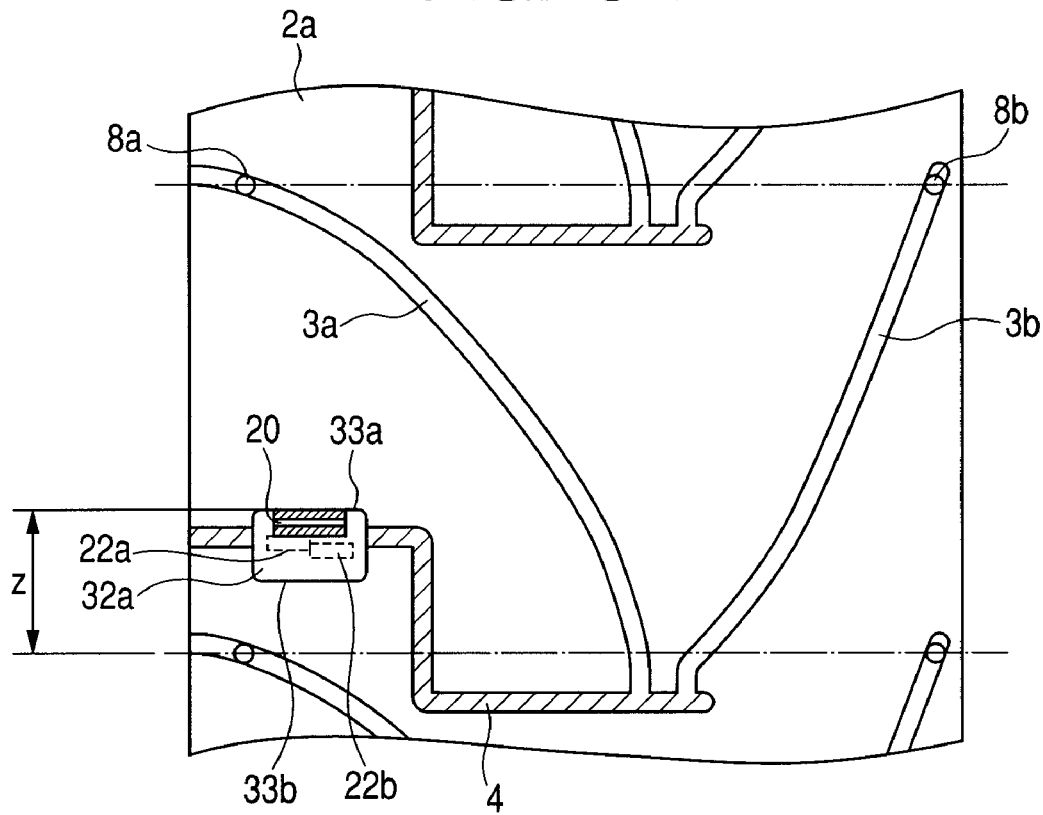
FIG. 3A is a developed view illustrating a cam circumference surface according to the first embodiment.

FIG. 3A is a developed view illustrating the cylindrical surface of the cam 2a. A position of the stopper limit groove 32a in the cam 2a is described with reference to FIG. 3A. In FIG. 3A, the curved cam rollers 8a and 8b are in the state at the wide angle end of zooming. The stopper limit groove 32a is provided so that the movable stopper 20 is in contact with the fixed stopper 22a at the wide angle end, and located in a position shifted from a wide angle end position of the cam grooves 3a and 3b by an angle "z" to avoid the cam grooves 3a and 3b.

As described according to this embodiment, the movable stopper 20 is provided in the cylindrical surface portion in which the cam grooves are formed. Therefore, unlike a case where the movable stopper is provided in an extended portion of the cam center axis which is not on the cylindrical portion, an effect is obtained in which the size of the cylindrical grooved cam does not increase in the axial direction.

The stopper limit groove 32a is provided, and hence the rigidity and barycentric balance of the cam 2a may be changed. In this case, an inner diameter side thickness of the cam 2a may be increased or a groove may be further provided in the circumference of the cam to improve the rigidity and adjust the barycentric balance. A cam installation groove 4 indicated by a hatched area of FIG. 3A is a groove for inserting and removing the zoom lens unit 7b from and to the left of FIG. 3A. When the zoom lens units 7a and 7b are to be inserted and removed, the movable stopper 20 detachable from the removable stopper base 23 is detached from the removable stopper base 23. Therefore, the rotation restriction of the cam 2a is removed, and hence the zoom lens units 7a and 7b may be inserted from the left of FIG. 3A to the fixed cylinder 5 and removed from the fixed cylinder 5 to the left of FIG. 3A.

Figure 1B:
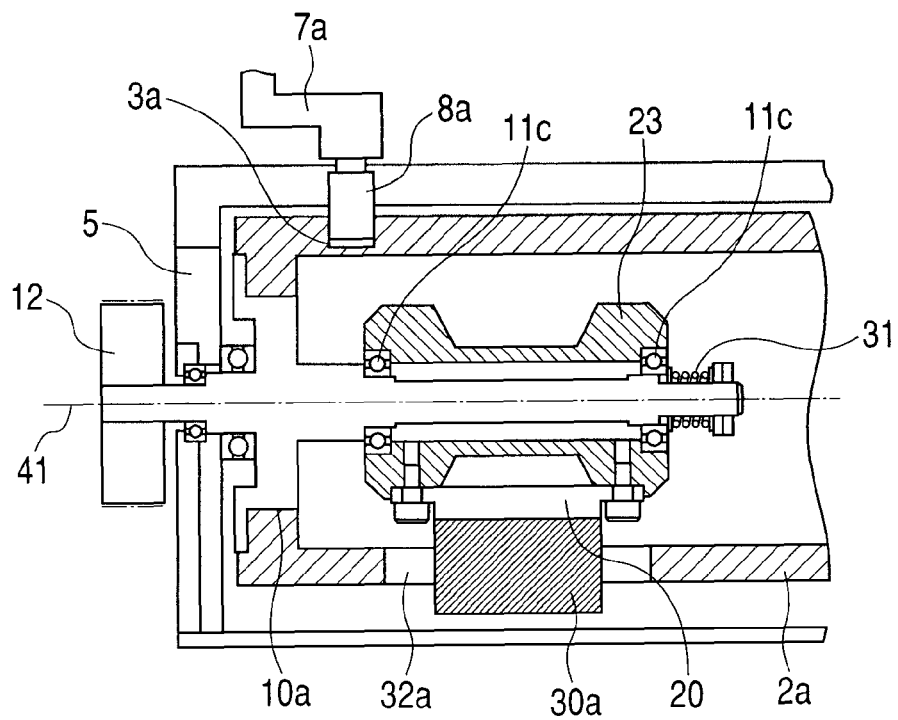
FIG. 1B illustrates a stopper mechanism according to the first embodiment.
Figure 3B:
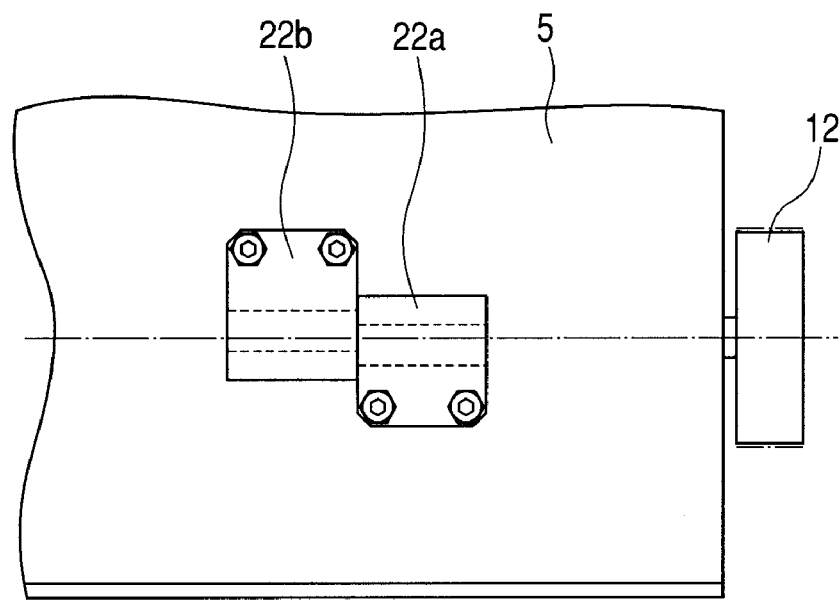
FIG. 3B illustrates a fixed stopper according to the first embodiment.

FIG. 3B illustrates the stopper unit illustrated in FIG. 1B as viewed from a rear surface side. The two fixed stoppers 22a and 22b are used as fixed-side stoppers. The fixed stoppers 22a and 22b are adjustably fixed to the fixed cylinder 5 by bolts in a vertical direction of FIG. 3B. When the wide angle end and telephoto end positions which are optically measured are to be aligned to the stopper positions, the cam 2a is first rotated to set the optically wide angle end and telephoto end positions. The fixed stoppers 22a and 22b are fixed so that the fixed stoppers 22a and 22b are in contact with the movable stopper ends 21a and 21b at the respective positions. When the positions of the fixed stoppers 22a and 22b are adjusted as described above, the optically wide angle end and telephoto end positions may be set.

As described above, according to this embodiment, the rotation stopper mechanism for a cylindrical grooved cam having an allowable rotation limit equal to or larger than 360° without the increase in diameter of the cylindrical grooved cam and the extension thereof in the rotation axis direction may be realized.

Modified Example

In the first embodiment, an impact when the movable stopper 20 is in contact with the fixed stoppers 22a and 22b or the stopper limit groove ends in the case where the cylindrical grooved cam reaches the ends in the movable rotation angle range is absorbed by the stopper rubber 30a (elastic member) bended to the movable stopper 20.

Figure 4:
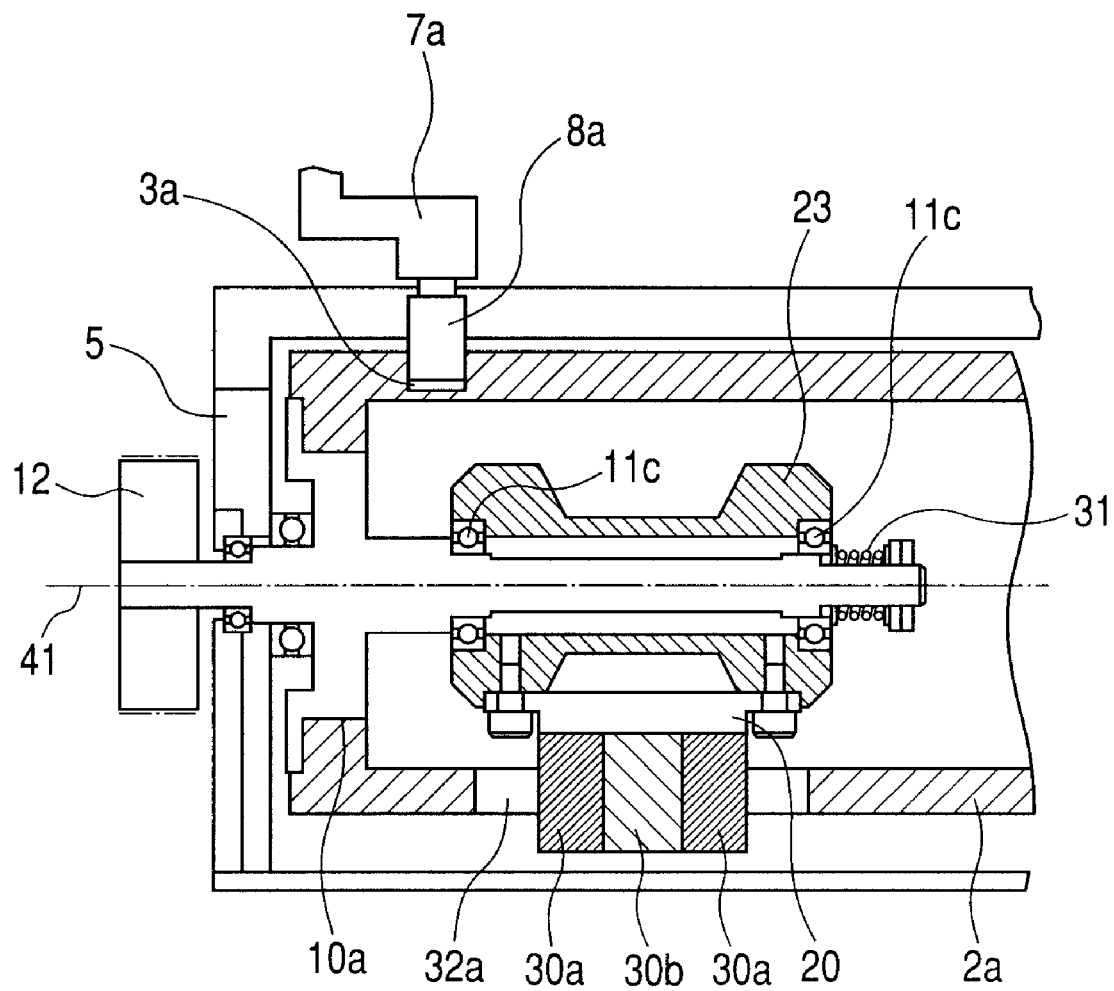
FIG. 4 is an axial cross sectional view illustrating the stopper mechanism according to the first embodiment.

Hereinafter, a modified example of the structure for absorbing the above-mentioned impact is described with reference to FIG. 4.

In this modified example, unlike the first embodiment, a stopper rubber 30b is provided in addition to the stopper rubber 30a. The stopper rubber 30b has hardness lower (elasticity coefficient smaller) than the stopper rubber 30a and a thickness set to be in contact with the fixed stoppers 22a and 22b before the contact of the stopper rubber 30a therewith. For example, when the cam 2a rotates and becomes the state illustrated in FIG. 2C, the fixed stopper 22b is firstly in contact with the stopper rubber 30b. Therefore, when the two kinds of elastic members having different elasticity coefficients are provided in the contact portion of the movable stopper 20, an impact force and an impact sound which are generated at the time of contact with the fixed stopper 22b may be reduced. After that, when the cam 2a further rotates in the clockwise direction in the state of FIG. 2C, the stopper rubber 30a is finally in contact with the fixed stopper 22b and the stopper limit groove end 33b, and hence the final position corresponding to the telephoto end is determined. This is because a compression stress of the stopper rubber 30b when the stopper rubber 30a is in contact with the fixed stoppers 22a and 22b and the stopper limit groove ends 33a and 33b is equal to smaller than a minimum torque necessary to rotate the cam 2a. The same applies to the case where the cam 2a rotates from the telephoto end to the wide angle end.

As described above, the impact force and the impact sound which are generated by the contact of the stopper may be reduced to realize the rotation stopper mechanism having the rotation limit equal to or larger than 360°. In this embodiment, the rubbers having the different hardnesses (elasticity coefficients) are used in combination. However, even when materials such as sponges or resins except the rubbers are used or even when shapes of parts which are in contact with each other are changed, the same effect is obtained. In this embodiment, the structure is employed in which the elastic members are provided to the movable stopper 20. However, the present invention is not limited to this structure. Even when the elastic members are provided in the fixed stoppers 22a and 22b and the end portions of the stopper limit groove 32a, the same effect may be obtained.

Second Embodiment

Figure 5A:
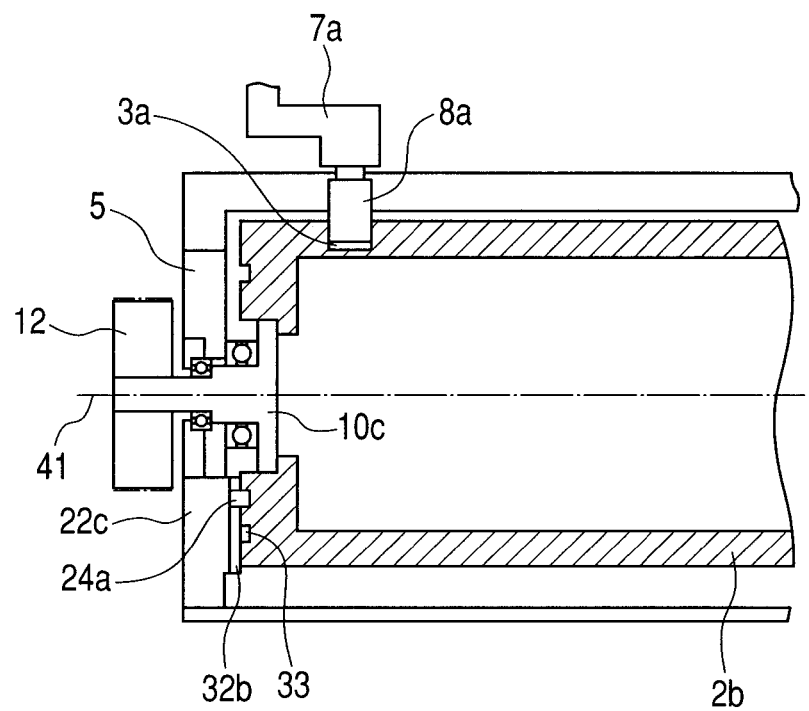
FIG. 5A is an axial cross sectional view illustrating a stopper mechanism according to a second embodiment of the present invention.
Figure 5B:
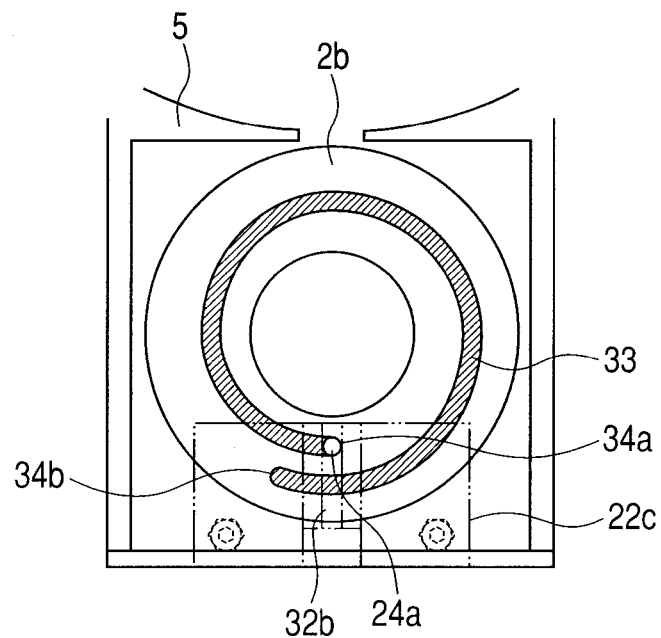
FIG. 5B is an axial orthogonal cross sectional view illustrating a helical groove of the stopper mechanism according to the second embodiment.

Hereinafter, a cam stopper mechanism according to a second embodiment of the present invention is described with reference to FIGS. 5A and 5B.

This embodiment is different from the first embodiment only in the stopper mechanism. FIG. 5A is an enlarged view illustrating a zoom stopper mechanism. A cam 2b includes a helical groove 33 on the left side of FIG. 5A. The helical groove 33 is formed in a plane substantially perpendicular to a rotation axis of the cam and serves as a stopper restrictor of the cam. A fixed stopper 22c is fixed to the fixed cylinder (lens barrel) 5 by bolts. A stopper limit groove 32b extending in a direction crossing the helical groove 33 is formed in the fixed stopper 22c. A stopper roller 24a which is a movable stopper is engaged with the helical groove 33 and the stopper limit groove 32b at an intersection therebetween so as to be slidable therealong. FIG. 5B illustrates the helical groove 33 as viewed from substantially the left side of FIG. 5A. The position illustrated in FIG. 5B corresponds to the state at the wide angle end. The stopper roller 24a is in contact with a helical groove end portion 34a which is an end of the helical groove 33 and the stopper limit groove 32b, and hence the rotation of the cam 2b in the clockwise direction in the state of FIG. 5B is restricted. When the cam 2b rotates in the counterclockwise direction, the stopper roller 24a slides along the helical groove 33 while the rotation about the cam center axis 41 is restricted by the stopper limit groove 32b. Then, when the stopper roller 24a reaches a helical groove end portion 34b which is the other end of the helical groove 33, the rotation of the cam 2b in the counterclockwise direction is stopped. Positions of the helical groove end portions 34a and 34b are set based on a rotation limit required for the cam 2b. In this embodiment, the positions are set for a rotation angle of 380°. Holes through which fixing bolts pass are long in the lateral direction of FIG. 5B, and hence the fixed stopper 22c may be fixed by adjustment in the lateral direction of FIG. 5B. Therefore, for example, the stop position of the rotated cam at the wide angle end may be adjusted by moving the fixed stopper 22c in the lateral direction of FIG. 5B. When the fixed stopper 22c is detached from the fixed cylinder 5, the rotation restriction of the cam 2b is removed, and hence, as described in the first embodiment, the zoom lens units 7a and 7b may be inserted to and removed from the fixed cylinder 5.

In this embodiment, the stopper roller 24a reaches (is in contact with) the end portions 34a and 34b of the helical groove 33, and hence the rotation limit of the cam 2b is restricted. However, the present invention is not limited to this. The stopper roller 24a may be in contact with the end portions of the stopper limit groove 32b to restrict the rotation limit of the cam 2b. Alternatively, the stopper roller 24a may be in contact with the end portions 34a and 34b of the helical groove 33 and the end portions of the stopper limit groove 32b to restrict the rotation limit of the cam 2b.

As described above, according to this embodiment, the rotation stopper mechanism for the cylindrical cam having the allowable rotation limit equal to or larger than 360° without the increase in diameter of the cylindrical cam and the extension thereof in the rotation axis direction may be realized.

Third Embodiment

Figure 6A:
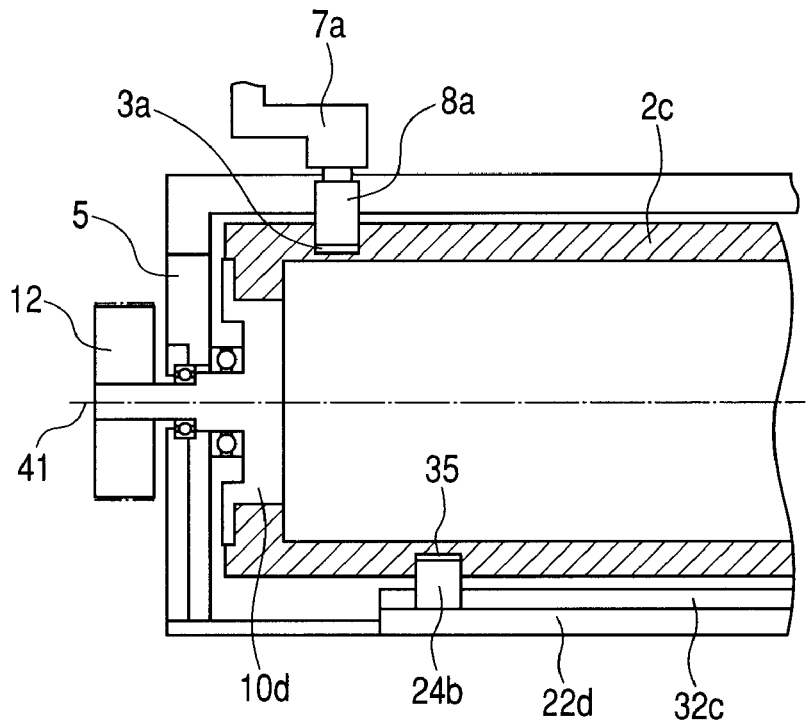
FIG. 6A is an axial cross sectional view illustrating a stopper mechanism according to a third embodiment of the present invention.
Figure 6B:
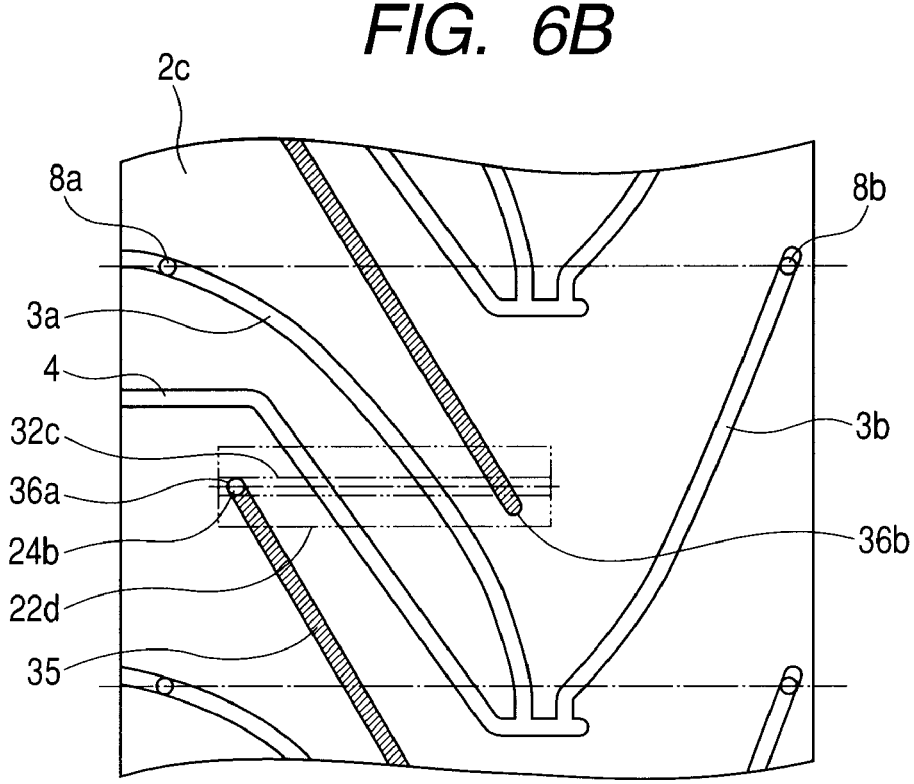
FIG. 6B is a developed view illustrating a cam circumference surface according to the third embodiment.

Hereinafter, a cam stopper mechanism according to a third embodiment of the present invention is described with reference to FIGS. 6A and 6B.

This embodiment is different from the first embodiment only in the stopper mechanism. FIG. 6A is an enlarged view illustrating a zoom stopper mechanism. A cam 2c includes a spiral groove 35 provided in a circumference thereof. The spiral groove 35 serves as a stopper restrictor of the cam. A fixed stopper 22d is fixed to the fixed cylinder 5 by bolts. A stopper limit groove 32c extending in a direction crossing the spiral groove 35 is formed in the fixed stopper 22d. A stopper roller 24b which is a movable stopper is engaged with the spiral groove 35 and a stopper limit groove 32c at an intersection therebetween so as to be slidable thereon. FIG. 6B is a developed view illustrating a circumference surface of the cam 2c. The spiral groove 35 is indicated by hatch lines and formed in the circumference of the cam 2C at a position to avoid the cam grooves 3a and 3b. FIG. 6B illustrates a state at the wide angle end. The stopper roller 24b is in contact with a spiral groove end portion 36a which is an end of the spiral groove 35 and the stopper limit groove 32c, and hence the rotation of the cam 2c in the clockwise direction in the state of FIG. 6B is restricted. When the cam 2c rotates in the counterclockwise direction, the stopper roller 24b slides along the spiral groove 35 while the rotation about the cam center axis 41 is restricted by the stopper limit groove 32c. Then, when the stopper roller 24b reaches a spiral groove end portion 36b which is the other end of the spiral groove 35, the rotation of the cam 2c in the counterclockwise direction is stopped. Positions of the spiral groove end portions 36a and 36b are set based on a rotation limit required for the cam 2c. In this embodiment, a rotation angle is 380°. Holes through which clamping bolts pass are long in the vertical direction of FIG. 6B, and hence the fixed stopper 22d may be fixed by adjustment in the vertical direction of FIG. 6B. Therefore, for example, the stop position of the rotated cam at the wide angle end may be adjusted by moving the fixed stopper 22d in the vertical direction of FIG. 6B. When the fixed stopper 22d is detached from the fixed cylinder 5, the rotation restriction of the cam 2c is removed, and hence, as described in the first embodiment, the zoom lens units 7a and 7b may be inserted to and removed from the fixed cylinder 5.

In this embodiment, the stopper roller 24b reaches (is in contact with) the end portions 36a and 36b of the spiral groove 35, and hence the rotation limit of the cam 2c is restricted. However, the present invention is not limited to this. The stopper roller 24b may be in contact with the end portions of the stopper limit groove 32c to restrict the rotation limit of the cam 2c. Alternatively, the stopper roller 24b may be in contact with the end portions 36a and 36b of the spiral groove 35 and the end portions of the stopper limit groove 32c to restrict the rotation limit of the cam 2c.

As described above, according to this embodiment, the rotation stopper mechanism for the cylindrical cam having the allowable rotation limit equal to or larger than 360° without the increase in diameter of the cylindrical cam and the extension thereof in the rotation axis direction may be realized.

The first embodiment exhibits the structure in which the elastic member is provided in the contact portion of the movable stopper in order to reduce the impact when the movable stopper is in contact with the opening of the cam member or the end portions of the fixed stoppers. Note that, similarly, in the cases of the second and third embodiments, the elastic member is provided in the contact portion of the movable stopper which is in contact with the helical groove portion or the spiral groove portion of the cam member and the groove portions of the fixed stoppers, and hence the same impact absorption effect is obtained.

The embodiments described above exhibit the cam mechanisms with respect to the zoom lens units moved in the lens barrel. However, the present invention is not limited to only the cam mechanisms applied to the zoom lens units. Note that, even when any one of the cam mechanisms is applied as a cam mechanism used to move lens units in an optical axis direction, the same effect is obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-237358, filed on Oct. 14, 2009, which is hereby incorporated by reference herein in its entirety.

What is claimed is:

1. A lens apparatus comprising:
   a lens barrel;
   a fixed stopper fixed to the lens barrel;
   an optical unit moving in a direction of an optical axis relative to the lens barrel;
   a cylindrical grooved cam which includes a stopper restrictor and is held in the lens barrel to be rotatable about a rotation axis parallel to the optical axis, for restricting movement of the optical unit in the direction of the optical axis; and
   a movable stopper which is movable within a range of the stopper restrictor,
   wherein the movable stopper is in contact with the stopper restrictor and the fixed stopper to restrict a rotation range of the cylindrical grooved cam;
   wherein the movable stopper is held inside a cylindrical surface of the cylindrical grooved cam to be rotatable coaxially with the cylindrical grooved cam and to be detachably attachable,
   wherein the stopper restrictor is an end portion of an opening provided in the cylindrical surface of the cylindrical grooved cam;
   wherein the movable stopper protrudes from the cylindrical surface of the cylindrical grooved cam through the opening; and
   wherein the movable stopper is in contact with the end portion of the opening and an end surface of the fixed stopper to restrict the rotation range of the cylindrical grooved cam.

2. A lens apparatus according to claim 1, wherein:
   the cylindrical grooved cam further comprises a shaft which is coaxial with the rotation axis of the cylindrical grooved cam, a bearing, and a biasing unit;
   the movable stopper is held to the shaft through the bearing; and
   the bearing is precompressed by the biasing unit to prevent the movable stopper from rotating about the shaft by self weight.

3. A lens apparatus according to claim 1, wherein:
the stopper restrictor is a helical groove formed in a plane perpendicular to the rotation axis of the cylindrical grooved cam;
the fixed stopper is held to the lens barrel to be detachably attachable and includes a groove provided in a direction crossing the helical groove;
the movable stopper engages with the helical groove of the cylindrical grooved cam and the groove of the fixed stopper at an intersection therebetween so as to be slidable thereon; and
the movable stopper is in contact with at least one of an end portion of the helical groove of the cylindrical grooved cam and an end portion of the groove of the fixed stopper to restrict the rotation range of the cylindrical grooved cam.

4. A lens apparatus according to claim 1, wherein:
the stopper restrictor is a spiral groove formed in a cylindrical surface of the cylindrical grooved cam;
the fixed stopper is held to the lens barrel to be detachably attachable and includes a groove provided in a direction crossing the spiral groove;
the movable stopper engages with the spiral groove and the groove of the fixed stopper at an intersection therebetween so as to be slidable thereon; and
the movable stopper is in contact with at least one of an end portion of the spiral groove and an end portion of the groove of the fixed stopper to restrict the rotation range of the cylindrical grooved cam.

5. A lens apparatus according to claim 1, wherein:
a position at which the fixed stopper is fixed to the lens barrel is adjusted to adjust the rotation range of the cylindrical grooved cam.

6. A lens apparatus according to claim 1, wherein:
the movable stopper includes a contact portion which is in contact with the stopper restrictor and the fixed stopper; and
the contact portion includes an elastic member.

7. A lens apparatus according to claim 1, wherein:
the movable stopper includes a contact portion which is in contact with the stopper restrictor and the fixed stopper; and
the contact portion includes two kinds of elastic members having different elasticity coefficients.

8. A lens apparatus according to claim 1, wherein:
the stopper restrictor and the fixed stopper contact with the movable stopper from directions opposite to each other to restrict the rotation range of the cylindrical grooved cam.

9. A lens apparatus according to claim 1, wherein:
the stopper restrictor includes a first stopper restrictor and a second stopper restrictor which is different from the first stopper restrictor;
the fixed stopper includes a first part and a second part which is different from the first part;
the first part and the first stopper restrictor contact with the movable stopper from directions opposite to each other to restrict the rotation range of the cylindrical grooved cam; and
the second part and the second stopper restrictor contact with the movable stopper from directions opposite to each other to restrict the rotation range of the cylindrical grooved cam.

10. A lens apparatus comprising:
a lens barrel;
a fixed stopper fixed to the lens barrel;
an optical unit moving in a direction of an optical axis relative to the lens barrel;
a cylindrical grooved cam which includes a stopper restrictor and is held in the lens barrel to be rotatable about a rotation axis parallel to the optical axis, for restricting movement of the optical unit in the direction of the optical axis; and
a movable stopper which is movable within a range of the stopper restrictor,
wherein the movable stopper is in contact with the stopper restrictor and the fixed stopper to restrict a rotation range of the cylindrical grooved cam;
wherein the stopper restrictor is a helical groove formed in a plane perpendicular to the rotation axis of the cylindrical grooved cam;
wherein the fixed stopper is held to the lens barrel to be detachably attachable and includes a groove provided in a direction crossing the helical groove;
wherein the movable stopper engages with the helical groove of the cylindrical grooved cam and the groove of the fixed stopper at an intersection therebetween so as to be slidable thereon; and
wherein the movable stopper is in contact with at least one of an end portion of the helical groove of the cylindrical grooved cam and an end portion of the groove of the fixed stopper to restrict the rotation range of the cylindrical grooved cam.

11. A lens apparatus comprising:
a lens barrel;
a fixed stopper fixed to the lens barrel;
an optical unit moving in a direction of an optical axis relative to the lens barrel;
a cylindrical grooved cam which includes a stopper restrictor and is held in the lens barrel to be rotatable about a rotation axis parallel to the optical axis, for restricting movement of the optical unit in the direction of the optical axis; and
a movable stopper which is movable within a range of the stopper restrictor,
wherein the movable stopper is in contact with the stopper restrictor and the fixed stopper to restrict a rotation range of the cylindrical grooved cam;
wherein the stopper restrictor is a spiral groove formed in a cylindrical surface of the cylindrical grooved cam;
wherein the fixed stopper is held to the lens barrel to be detachably attachable and includes a groove provided in a direction crossing the spiral groove;
wherein the movable stopper engages with the spiral groove and the groove of the fixed stopper at an intersection therebetween so as to be slidable thereon; and
wherein the movable stopper is in contact with at least one of an end portion of the spiral groove and an end portion of the groove of the fixed stopper to restrict the rotation range of the cylindrical grooved cam.

12. A lens apparatus comprising:
a lens barrel;
a fixed stopper fixed to the lens barrel;
an optical unit moving in a direction of an optical axis relative to the lens barrel;
a cylindrical grooved cam which includes a stopper restrictor and is held in the lens barrel to be rotatable about a rotation axis parallel to the optical axis, for restricting movement of the optical unit in the direction of the optical axis; and a movable stopper which is movable within a range of the stopper restrictor, wherein the movable stopper is in contact with the stopper restrictor and the fixed stopper to restrict a rotation range of the cylindrical grooved cam; and wherein a position at which the fixed stopper is fixed to the lens barrel is adjusted to adjust the rotation range of the cylindrical grooved cam.

13. A lens apparatus comprising:

a lens barrel;

a fixed stopper fixed to the lens barrel;

an optical unit moving in a direction of an optical axis relative to the lens barrel;

a cylindrical grooved cam which includes a stopper restrictor and is held in the lens barrel to be rotatable about a rotation axis parallel to the optical axis, for restricting movement of the optical unit in the direction of the optical axis; and a movable stopper which is movable within a range of the stopper restrictor, wherein the movable stopper is in contact with the stopper restrictor and the fixed stopper to restrict a rotation range of the cylindrical grooved cam;

wherein the movable stopper includes a contact portion which is in contact with the stopper restrictor and the fixed stopper; and wherein the contact portion includes an elastic member.

14. A lens apparatus comprising:

a lens barrel;

a fixed stopper fixed to the lens barrel;

an optical unit moving in a direction of an optical axis relative to the lens barrel;

a cylindrical grooved cam which includes a stopper restrictor and is held in the lens barrel to be rotatable about a rotation axis parallel to the optical axis, for restricting movement of the optical unit in the direction of the optical axis; and a movable stopper which is movable within a range of the stopper restrictor, wherein the movable stopper is in contact with the stopper restrictor and the fixed stopper to restrict a rotation range of the cylindrical grooved cam; and wherein the stopper restrictor and the fixed stopper contact with the movable stopper from directions opposite to each other to restrict the rotation range of the cylindrical grooved cam.

15. A lens apparatus comprising:

a lens barrel;

a fixed stopper fixed to the lens barrel;

an optical unit moving in a direction of an optical axis relative to the lens barrel;

a cylindrical grooved cam which includes a stopper restrictor and is held in the lens barrel to be rotatable about a rotation axis parallel to the optical axis, for restricting movement of the optical unit in the direction of the optical axis; and a movable stopper which is movable within a range of the stopper restrictor, wherein the movable stopper is in contact with the stopper restrictor and the fixed stopper to restrict a rotation range of the cylindrical grooved cam;

wherein the stopper restrictor includes a first stopper restrictor and a second stopper restrictor which is different from the first stopper restrictor;

wherein the fixed stopper includes a first part and a second part which is different from the first part;

wherein the first part and the first stopper restrictor contact with the movable stopper from directions opposite to each other to restrict the rotation range of the cylindrical grooved cam; and wherein the second part and the second stopper restrictor contact with the movable stopper from directions opposite to each other to restrict the rotation range of the cylindrical grooved cam.

16. A camera apparatus including a lens apparatus according to claim 1.

17. A camera apparatus including a lens apparatus according to claim 10.

18. A camera apparatus including a lens apparatus according to claim 11.

19. A camera apparatus including a lens apparatus according to claim 12.

20. A camera apparatus including a lens apparatus according to claim 13.

21. A camera apparatus including a lens apparatus according to claim 14.

22. A camera apparatus including a lens apparatus according to claim 15.

* * * * *